United States Patent [19]

Stone

[11] 4,072,858
[45] Feb. 7, 1978

[54] LASER BEAM INTENSITY REGULATOR

[75] Inventor: Samuel M. Stone, Lynnfield, Mass.

[73] Assignee: GTE Laboratories Incorporated, Waltham, Mass.

[21] Appl. No.: 708,652

[22] Filed: July 26, 1976

[51] Int. Cl.² ............................................. G01J 1/32
[52] U.S. Cl. .................................. 250/205; 331/94.5 S
[58] Field of Search ................. 250/205, 201; 350/166, 350/169, 171, 172; 331/94.5 S

[56] References Cited

U.S. PATENT DOCUMENTS

| 3,142,528 | 7/1964 | Stafford et al. | 350/166 |
| 3,780,296 | 12/1973 | Waksberg et al. | 331/94.5 S |

OTHER PUBLICATIONS

Bangert, Theron, Eigner "Design of Laser Mirrors with Intermediate Reflectances" Optics Communications, vol. 6, #4, Dec. 1972.
Furman "Dielectric Narrow – Band Filter" Optics and Spectroscopy, vol. 28, No. 2, Feb. 1970.

Primary Examiner—Alfred E. Smith
Assistant Examiner—David K. Moore
Attorney, Agent, or Firm—Robert A. Seldon

[57] ABSTRACT

A laser beam intensity regulator is disclosed for independently regulating the relative intensities of the coaxial monochromatic beams eminating from a multiwavelength laser. First, the monochromatic beams are spatially separated. Utilizing the shift of a dielectric mirror's pass band towards lower wavelengths as the angle of incident beam thereon increases, the regulator described herein includes a rotatable dielectric mirror placed in the path of the monochromatic beam to be regulated. The wavelength of the beam lies on the edge of the mirror's pass band so that the amount of light transmitted through the mirror changes as a function of the angle of incidence. The mirror is controllably rotated in response to the difference between the actual and desired beam intensities to maintain the beam at the desired intensity.

9 Claims, 3 Drawing Figures

4,072,858

LASER BEAM INTENSITY REGULATOR

FIELD OF THE INVENTION

This invention relates to a method and apparatus for regulating the intensity of a laser beam. In applications where one or more laser beams are used, it is frequently desirable to maintain a constant intensity of one beam, or proper relative intensities of several beams which may either eminate from separate lasers or from a single a multi-wavelength laser.

Laser displays, for example, modulate the intensity of different color (i.e., wavelength) beams which are subsequently combined to produce color images. It may be appreciated that the relative intensities of the beams must be regulated to ensure that the color mix of the combined modulated beams accurately reproduces the color of the images.

SUMMARY OF THE PRIOR ART

Single laser beams have been intensity regulated by regulating the current in the laser discharge, or exciting, current. In multi-wavelength lasers, however, the intensities of the remaining beams are independent of the beam thus controlled and may change as the gas pressure within the laser tube and the discharge current vary with time.

SUMMARY OF THE INVENTION

It is, therefore, an object of the present invention to independently regulate the intensities of the plurality of laser beams eminating from a multi-wavelength laser.

It is another object of the invention to regulate the relative intensities of a plurality of laser beams.

In its broadest aspect, the invention is directed towards a variable attenuator which is inserted in the path of the beam to be regulated and which is controllably varied to maintain a desired beam intensity at its output. The attenuator comprises a partially transmissive dielectric mirror and utilizes an effect that occurs when the angle of a beam's incidence thereon is varied.

At off-normal angles of incidence, the center wavelength of the transmitted light, as well as the passband edge of the mirror, shifts to lower wavelengths. The effect of such a shift is that the amount of transmitted light of wavelength $\lambda_o$ changes as a function of the angle of beam incidence.

In its preferred embodiment, the instant invention provides a rotatable dielectric mirror responsive to the difference between the desired and actual beam intensities. The desired intensity may be preset or, alternatively, may be related to the intensity of a reference beam. The actual intensity is monitored by a photodetecting means. Further features of the invention will be apparent from the following detailed description which is to be read in conjunction with the following drawing.

DETAILED DESCRIPTION OF THE PREFERRED EMBODIMENT

Figure 1:
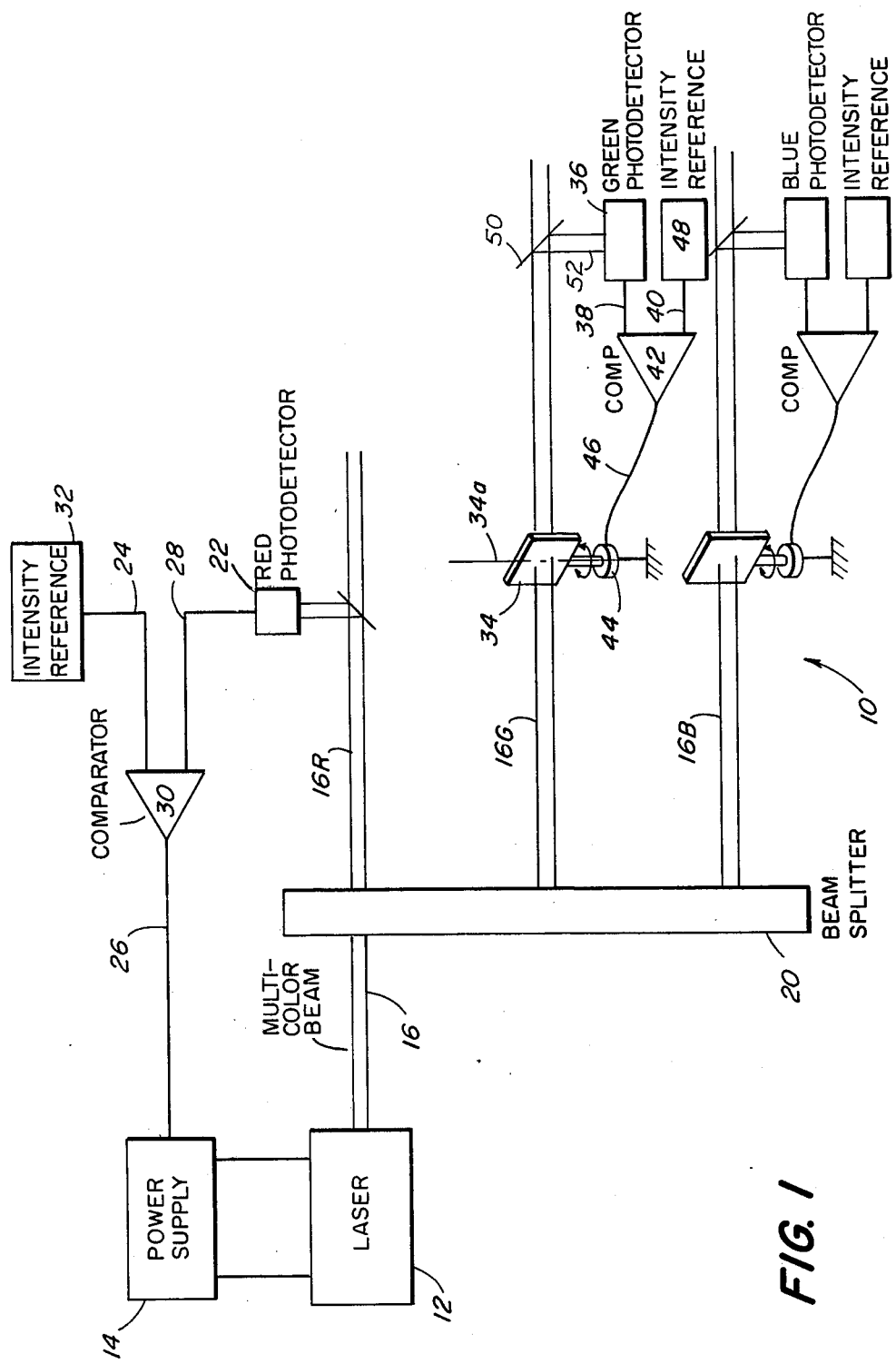
FIG. 1 is a schematic illustration of a laser beam intensity regulator constructed in accordance with the invention and used in a multi-color laser display system.

FIG. 1 is a schematic illustration of a laser beam intensity regulator, shown generally at 10, constructed in accordance with the invention and used in a multi-color laser display system.

Laser display systems are generally known in the art and a detailed description of its operation is beyond the scope of this application. For the sake of clarity, however, and to place the subject intensity regulator in proper context, pertinent characteristics of the display system will be briefly described.

In FIG. 1, a mixed krypton-argon ion laser 12 is excited by a power supply 14 and generates a multi-color coaxial beam 16. The beam 16 conventionally comprises the three primary colors: red (647nm), blue (488nm) and green (514.5nm). The beam 16 is directed into a beam splitter 20, where it may be split by a system of prisms into monochromatic beams of each of its constituent colors. Each such beam is modulated in accordance with a color-related video signal, and recombined with the other beams to form a multi-color coaxial beam which is scanned across the display area. It may be appreciated that the color of the reproduced image is dependent upon the color "mix" of the scanned beam and that the "mix", in turn, is governed by both the ratio of the modulating signals and the ratio of the unmodulated monochromatic beam intensities. The laser beam intensity regulator disclosed herein regulates the relative intensities of the monochromatic beams to thereby provide three monochromatic beams in the required proportions prior to video modulation.

Turning now to FIG. 1, the multi-color laser beam 16 is shown being divided into its three component colors by the beam splitter 20, which may simply comprise a set of prisms similar to the type used in a direct view spectroscope and which separates the beam 16 into three monochromatic beams 16R, 16G, 16B.

The intensity of the red beam 16R is regulated in the illustrated system by controlling the laser discharge current. The laser discharge current is regulated by the laser power supply 14 which is adjusted in response to a control signal 26 that results from the difference between the actual and the desired intensities of the red beam 16R. Accordingly, a photodetecting means 22 for producing a signal proportional to the actual red beam 16R intensity is coupled to one input of an operation amplifier 30. A reference signal 24, representing the desired red beam intensity, is generated by an adjustable source 32 and coupled to the remaining input of the amplifier 30.

It may be appreciated that the foregoing regulation of the red beam 16R intensity indirectly regulates the intensities of the green beam 16G and the blue beam 16B, since the intensity of the multi-color beams 16 is controlled by the power supply 14. As indicated above, the proper color mix of the ultimately scanned multi-color laser beam may be properly controlled only by controlling the relative intensities of the monochromatic beams. Attention is accordingly directed to the remaining monochromatic beams 16G, 16B. For simplicity, the method and apparatus of the present invention will be described with reference to the green beam 16G, although it will be apparent that the intensities of any other beams such as the blue beam 16B may be similarly regulated.

The green beam 16G is shown exiting from the beam splitter 20 and passing through a dielectric coated mirror 34. The mirror 34 is mounted for rotation about an axis 34A so that the angle of the beam 16G incident thereon may be varied. As known in the art, the mirror 34 comprises carefully controlled thicknesses of alternating layers of dielectric material arranged to provide a pass band. The principle by which such dielectric mirrors function is known in the art and beyond the scope of this application. An easily understandable treatment of the operating theory of such mirrors may be found in a brochure entitled *Thin Flim Optical Filter Guide*, published by the Corion Corporation in Holliston, Massachusetts. A more rigorous mathematical approach may be found in a book entitled *Thin Film Optical Filters*, by H. A. MacLeod. These sources of information are hereby incorporated by reference. For rather complex reasons explained in these references, the pass band associated with the dielectric mirror 34 shifts towards lower wavelengths as the angle of the incident beam diverges from the normal. This relationship may be appreciated by reference to FIG. 2, which graphically illustrates the variation in the transmission characteristics of a multi-layer dielectric mirror as the beam incidence varies.

Figure 2:
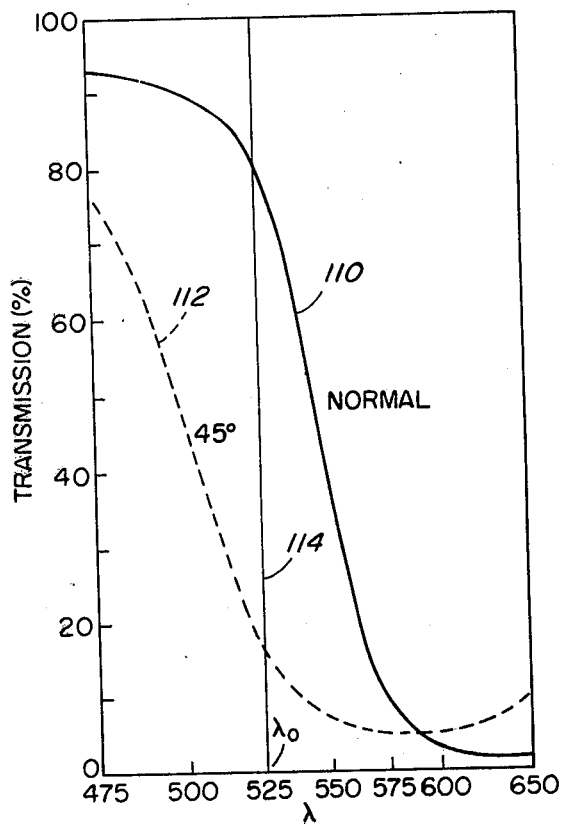
FIG. 2 is a graphic illustration of the wavelength-dependent transmission characteristics of a typical dielectric coated mirror and shows the shift to lower wavelengths produced by off-normal incidence.

Turning to FIG. 2, the pass band characteristics of a multi-layer dielectric mirror may be observed for two angles of beam incidence. A solid curve 110 illustrates the transmission characteristics of a multi-layer dielectric mirror for light which is incident normal to the surface of the mirror. The shift towards lower wavelengths may be appreciated by comparison of the curve 110 to the dashed curve 112 which represents the transmission characteristics of the mirror for light incident to the mirror surface at 45° from the normal. The effect of this shift upon a beam of a particular wavelength $\lambda_o$, lying on the edge of the pass band, may be appreciated in FIG. 2 by reference to the vertical line 114. The angular variation of the beam's incidence significantly effects the intensity of the transmitted beam. If a family of such curves as 110 and 112 were to be plotted for the various angles of incidence, their points of intersection with the line 114 would result in a curve illustrated in FIG. 3.

Figure 3:
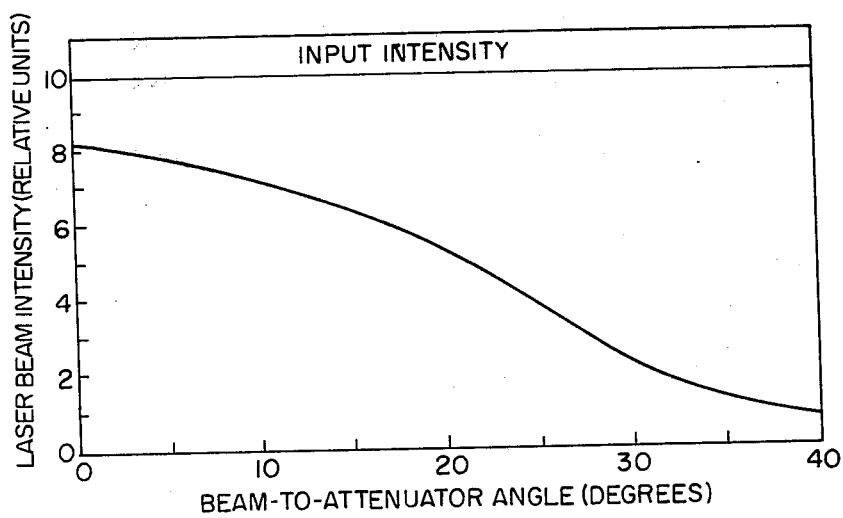
FIG. 3 is a graphic illustration of the attenuation of a particular wavelength of light derived by varying its angular incidence on the dielectric coated mirror.

FIG. 3 is a graphic illustration of the attenuation of a beam of wavelength $\lambda_o$ obtained by varying its angle of incidence on a dielectric coated mirror when $\lambda_o$ lies on the edge of the mirror's pass band. The beam intensity is shown in relative units with the normally incident beam having an assigned value of "10".

Accordingly, and with further reference to FIG. 1, the dielectric mirror 34 is mounted for rotation in the path of the beam 16G and about an axis 34A. The beam 16G is partially transmitted through the dielectric mirror 34 with an intensity which is related to its angle of incidence thereon. The intensity of the transmitted portion of the beam 16G is sampled by a partially reflecting mirror 50, the reflected beam 52 being directed to a photodetector 36 which produces an electrical signal 38 proportional to the beam intensity. The signal 38 is compared to a reference signal 40 by an operational amplifier 42. The output of the amplifier 42 is coupled to a means 44, such as a D'Arsonval meter movement, which is rotatable in response to a control signal 46 generated by the operational amplifier 42.

The reference signal 40 may be derived from an adjustable source 48 which is preset to a value equal to the output of the photodetector 36 at the intensity required for the green beam 16G.

Tests on prototype laser display systems have shown that a beam intensity regulator constructed in accordance with the invention can regulate the intensities to within 2% for input variations of 4 to 1.

In operation, the presence of an excessive proportion of green in the multi-color beam 16 will cause an imbalance between the signal 38 and the reference signal 40. The control signal 46 consequently generated by the amplifier 42 causes the mirror 34 to rotate in such a way that the angle of incidence of the beam 16G will increase from the normal to reduce the intensity of the transmitted beam portion. Conversely, a deficiency of green in the multi-color beam 16 will cause an imbalance between the signals 38 and the reference signal 40 so that the control signal 46 will rotate the mirror 34 in the direction which reduces the angular incidence of the beam 16G thereon.

Many variations and modifications to both the beam intensity regulator and the method for controlling the beam intensity in accordance with the invention are possible. One may, for example, regulate all the monochromatic beams of FIG. 1 with regulators of the type claimed herein rather than using the laser discharge or excitation currents to regulate one of them. Also, the color ratio of the recombined beams could be maintained for different laser output power levels by using one variable power supply for the reference voltages and utilizing potential dividers such as potentiometers to provide the reference signals for each color. It will be appreciated that the foregoing descriptions are illustrative and are not intended to limit the scope of the invention as defined in the appended claims.

I claim:

1. A laser beam intensity regulator comprising:
   means for generating a reference signal representing a desired beam intensity;
   a dielectric coated mirror having a passband whose sloping edge includes the beam bandwidth and mounted in the beam path to attenuate the beam;
   photodetecting means responsive to the attenuated beam intensity for generating an intensity-related signal;
   means for varying the angle of the beam incidence on the mirror in accordance with the difference between the reference and intensity-related signals so that the beam intensity is maintained at essentially the desired attenuated level.

2. The regulator of claim 1 wherein the dielectric mirror is mounted for rotation in the beam path, the angle varying means being responsive to the difference between the reference and intensity-related signals to rotate the mirror to a position where a beam of the desired intensity is transmitted therethrough.

3. The regulator of claim 2 including a rotatable member having a generally perpendicular axis of rotation with respect to the incident beam;
   current responsive means for rotatably displacing the member by an amount proportional to and in a direction related to the polarity of said signal difference,
   the dielectric mirror being mounted on the member for rotation therewith.

4. The regulator of claim 3 wherein the rotatable member and the current responsive means form a D'Arsonval meter movement.

5. A method for regulating the intensity of a laser beam comprising the steps of:
   producing a signal related to the difference between a desired beam intensity and the actual beam intensity;
   directing the beam through a dielectric coated mirror selected to include the bandwidth of the beam on the sloping edge of its passband; and
   varying the angle of the beam incidence from the normal to the plane of the mirror by an amount proportional to, and in a direction related to the polarity of, the signal to controllably attenuate the beam passing therethrough.

6. The method of claim 5 wherein the angle is varied by rotating the mirror.

7. The method of claim 5 including the steps of:
   generating a first signal representing a desired beam intensity;
   generating a second signal representing the actual beam intensity;
   producing a third signal related to the difference between the first and second signals;
   mounting the dielectric mirror on a rotatable member having a generally perpendicular axis of rotation with respect to the incident beam; and
   rotating the member by an amount proportional to and in a direction related to the polarity of the third signal.

8. The method of claim 7 including the steps of using a current-responsive rotatable structure to rotate the mirror; and
   coupling the third signal to the structure.

9. The method of claim 8 including the step of using a D'Arsonval meter movement to rotate the mirror.

* * * * *